United States Patent
Gauba et al.

(10) Patent No.: US 9,843,983 B1
(45) Date of Patent: Dec. 12, 2017

(54) DYNAMICALLY CONTROLLING A USER EQUIPMENT (UE) HANDOVER FROM A SOURCE REPEATER

(71) Applicant: Sprint Communications Company L.P., Overland Park, KS (US)

(72) Inventors: Maneesh Gauba, Overland Park, KS (US); Sreekar Marupaduga, Overland Park, KS (US); Nitesh Manchanda, Overland Park, KS (US); Vanil Parihar, Overland Park, KS (US); Gene S. Mitchell, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/231,959

(22) Filed: Aug. 9, 2016

(51) Int. Cl.
| | |
|---|---|
| *H04W 36/00* | (2009.01) |
| *H04W 36/38* | (2009.01) |
| *H04B 17/318* | (2015.01) |
| *H04W 36/22* | (2009.01) |
| *H04B 17/40* | (2015.01) |

(52) U.S. Cl.
CPC .......... *H04W 36/38* (2013.01); *H04B 17/318* (2015.01); *H04B 17/40* (2015.01); *H04W 36/22* (2013.01)

(58) Field of Classification Search
CPC ... H04W 88/04; H04W 84/047; H04W 84/18; H04W 28/12; H04B 7/15535; H04B 7/15557; H04B 17/318; H04B 7/14; H04B 7/15; H04B 7/15542; H04B 7/1555; H04B 7/18541

USPC ......................................................... 455/438
See application file for complete search history.

(56) References Cited

U.S. PATENT DOCUMENTS

| | | | |
|---|---|---|---|
| 5,465,398 A | * | 11/1995 | Flammer ............. H04W 52/225 455/115.3 |
| 5,987,011 A | | 11/1999 | Toh |
| 7,062,224 B2 | | 6/2006 | Baker et al. |
| 8,670,778 B2 | | 3/2014 | Si et al. |
| 8,811,887 B2 | | 8/2014 | Dottling et al. |
| 9,185,664 B2 | | 11/2015 | Park et al. |

(Continued)

FOREIGN PATENT DOCUMENTS

| | | |
|---|---|---|
| JP | 2001061174 | 3/2001 |
| JP | 2007158765 | 6/2007 |

*Primary Examiner* — Timothy Pham

(57) ABSTRACT

A communication system dynamically controls a User Equipment (UE) handover for multiple repeaters linked in series that include a source repeater and target repeater. The communication system determines individual UE loading for each of the multiple repeaters. The communication system modifies a handover threshold between the source repeater and the target repeater based on the UE loading for each of the multiple repeaters in the series. The communication system serves the UE over the source repeater and applies the modified handover threshold to a signal strength difference between the source repeater and the target repeater. The communication system inhibits the UE handover from the source repeater to the target repeater if the signal strength difference for the UE falls below the modified handover threshold and initiates the UE handover from the source repeater to the target repeater if the signal strength difference for the UE reaches the modified handover threshold.

18 Claims, 8 Drawing Sheets

(56) References Cited

U.S. PATENT DOCUMENTS

| | | |
|---|---|---|
| 2007/0129071 A1 | 6/2007 | Shapira |
| 2012/0294229 A1* | 11/2012 | Saito .................. H04W 72/082 370/315 |
| 2013/0258974 A1 | 10/2013 | Lee et al. |
| 2017/0105160 A1* | 4/2017 | Li ........................ H04W 36/30 |

* cited by examiner

DYNAMICALLY CONTROLLING A USER EQUIPMENT (UE) HANDOVER FROM A SOURCE REPEATER

TECHNICAL BACKGROUND

Wireless communication systems transfer data packets between User Equipment (UE) to provide data communication services, like internet access, media streaming, and user messaging. Wireless communication systems typically include wireless access nodes which provide access to communication services for wireless communication devices over wireless links. A typical wireless communication system includes systems to provide wireless access across a geographic region, with different wireless coverage areas associated with individual wireless access nodes. Communication services include voice calls, data exchange, web pages, streaming media, or text messages, among other communication services.

To expand or enhance the wireless signal coverage of a wireless communication network, such as in a Long Term Evolution (LTE) communication system, repeaters may be added to locations not adequately covered by current network infrastructure. A repeater transmits and receives wireless signals exchanged between wireless communication devices and a wireless access point. Without the signal repetition provided by the wireless repeater, the coverage area of the wireless network access point may otherwise have not extended far enough to serve the wireless communication devices using the repeater. Thus, a wireless repeater provides a less resource intensive means for increasing wireless network coverage.

Repeaters served by a wireless access point typically have a fixed capacity of wireless communication devices that may be served at a given time. Multiple repeaters in a series are often placed in areas of high wireless communication device traffic to better serve areas without adequate access to a wireless access point, such as a highway or near an event center. However, some areas may be more crowded than others which leads to certain repeaters becoming overloaded with wireless communication devices. This may result in repeaters going into oscillations and increasing their gain to combat the interference which is then repeated by repeaters further down the series causing wireless communication devices to be unable to connect to the network.

Therefore, wireless communication device loading needs to be distributed such that a repeater is not overloaded resulting in network access failure for wireless communication devices attempting to connect to repeaters further down a series. Unfortunately, current distribution techniques for wireless communication device traffic in a repeater series do not efficiently or effectively distribute wireless communication devices by dynamically controlling handovers. Furthermore, current distribution techniques do not dynamically re-direct wireless communication devices to better performing components, such as a better supported frequency band.

TECHNICAL OVERVIEW

A wireless communication system to dynamically control a User Equipment (UE) handover wherein the wireless communication system comprises multiple repeaters linked in series that include a source repeater and a target repeater. The wireless communication system determines individual UE loading for each of the multiple repeaters. The wireless communication system modifies a handover threshold between the source repeater and the target repeater based on the UE loading for each of the multiple repeaters in the series. The wireless communication system wirelessly serves a UE over the source repeater and applies the modified handover threshold to a signal strength difference between the source repeater and the target repeater. The wireless communication system inhibits the handover of the UE from the source repeater to the target repeater if the signal strength difference for the UE falls below the modified handover threshold. The wireless communication system initiates the handover of the UE from the source repeater to the target repeater if the signal strength difference for the UE reaches the modified handover threshold.

DETAILED DESCRIPTION

Figure 1:
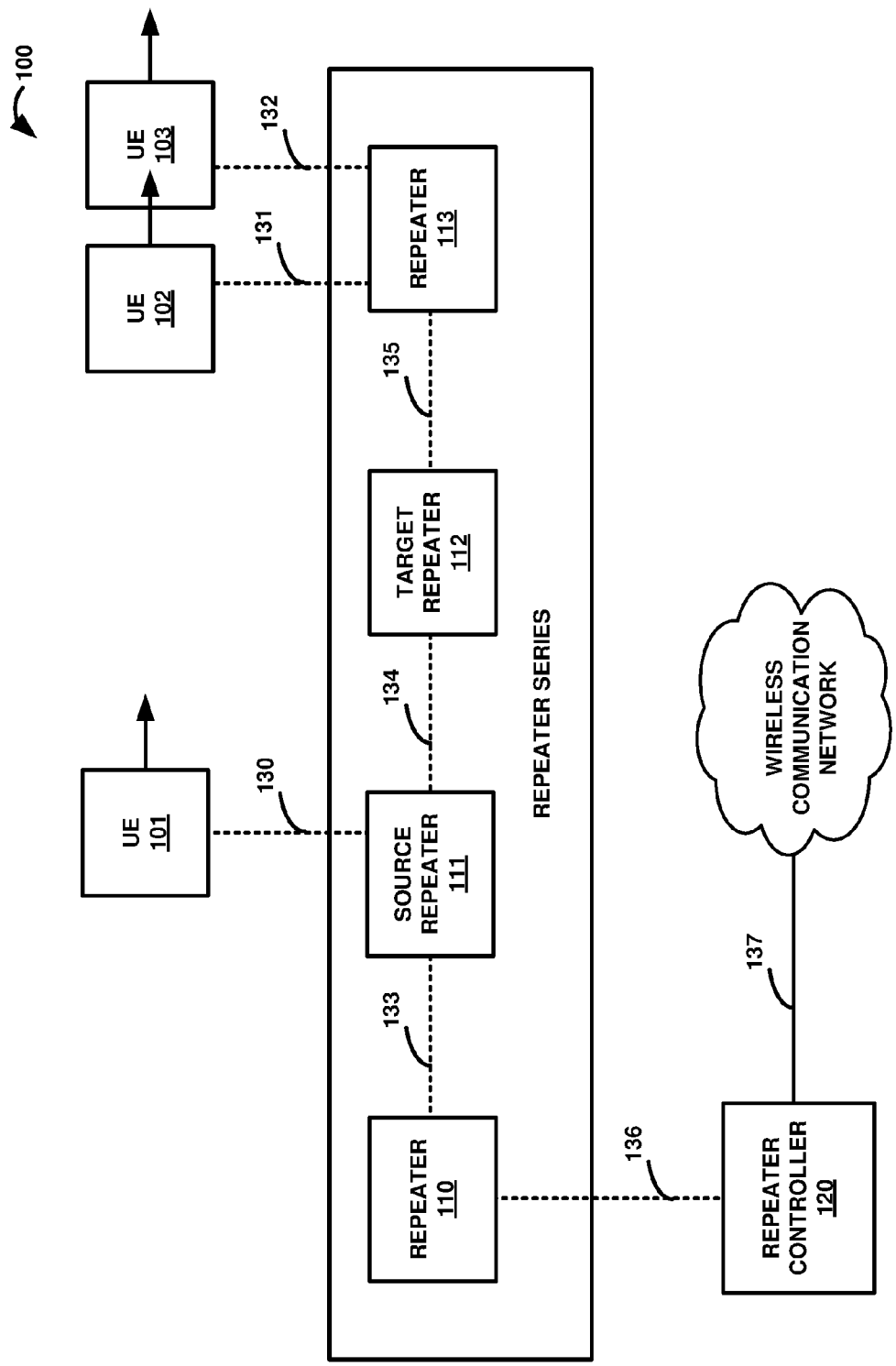
FIG. 1 is a block diagram that illustrates a wireless communication system to dynamically control a User Equipment (UE) handover wherein the wireless communication system comprises multiple repeaters linked in series that include a source repeater and a target repeater.

FIG. 1 is a block diagram that illustrates wireless communication system 100 to dynamically control a User Equipment (UE) handover. Wireless communication system 100 comprises multiple repeaters 110-113 linked in series that include source repeater 111 and target repeater 112. Wireless communication system 100 also includes UEs 101-103, repeater controller 120, and a wireless communication network. Although repeater controller 120 is shown to be external from the wireless communication network, in other examples repeater controller 120 may reside inside the wireless communication network.

UEs 101-103 communicate with multiple repeaters 110-113 over wireless links 130-132. Multiple repeaters 110-113 are connected in a series over wireless links 133-135. The repeater series communicates with repeater controller 120 over wireless link 136. Repeater controller 120 communicates with the wireless communication network over communication 137. As indicated by the arrows, the direction of UEs 101-103 mobility is from repeater 110 to repeater 113.

Still referring to FIG. 1, repeater controller 120 determines individual UE loading for each of multiple repeaters 110-113. Upon attaching to and registering with the wireless communication network, UEs 101-103 may transmit attachment information to repeater controller 120. The attachment information indicates which repeater in the series of repeaters UEs 101-103 are attached to. Repeater controller 120 may then determine a number of UEs each of multiple repeaters 110-113 is serving.

Repeater controller 120 modifies a handover threshold between source repeater 111 and target repeater 112 based on the UE loading for each of multiple repeaters 110-113 in the series. Source repeater 111 and target repeater 112 in the series typically have an initial handover threshold which triggers a handover of the UE from source repeater 111 to target repeater 112. The initial handover threshold may be compared to information received in a measurement report from a UE, such as UE 101. The handover threshold may be triggered by UE 101 leaving the coverage area of source repeater 111 or entering the coverage area of target repeater 112. The handover threshold may also be triggered by the measurement report indicating that the signal strength of source repeater 111 falls below the handover threshold or the signal strength of target repeater 112 falls above a threshold. The handover threshold may also be based on other UE information, such as UE mobility speed and roaming agreements.

The handover threshold is modified by repeater controller 120 based on UE loading of multiple repeaters 110-113. It should be noted that the modified handover threshold is not based solely on UE loading of source repeater 111 and target repeater 112. Instead, the modified handover threshold from source repeater 111 and target repeater 112 accounts for UE loading of other repeaters in the series, such as repeater 110, repeater 113, and any other repeater in series with source repeater 111 and target repeater 112. For example, the modified handover threshold may prevent a handover of UE 101 from source repeater 111 to target repeater 112 that would have occurred if the initial handover threshold was used. In other examples, the modified handover threshold may permit a handover of UE 101 from source repeater 111 to target repeater 112 that would not have occurred if the initial handover threshold was used.

In a next operation, source repeater 111 wirelessly serves UE 101 and applies the modified handover threshold to a signal strength difference between source repeater 111 and target repeater 112. Source repeater 111 may receive the modified handover threshold from repeater controller 120 and update handover parameters based on the modified handover threshold.

Source repeater 111 then inhibits the handover of UE 101 from source repeater 111 to target repeater 112 if the signal strength difference for UE 101 falls below the modified handover threshold. In some examples, a remote repeater of multiple repeaters 110-113 further down the repeater series in the direction of UE 101 mobility, such as repeater 113, is overloaded. In this example, the handover threshold between source repeater 111 and target repeater 112 is raised based on the overloaded repeater further down the repeater series. Therefore, the signal strength difference for UE 101 would falls below the modified handover threshold and the handover of UE 101 from source repeater 111 to target repeater 112 is inhibited.

In other examples, a remote repeater of multiple repeaters 110-113 further up the repeater series in the direction of UE 101 mobility, such as repeater 110, is underloaded. In this example, the handover threshold between source repeater 111 and target repeater 112 would be raised based on the underloaded repeater further up the repeater series and the handover of UE 101 from source repeater 111 to target repeater 112 is inhibited if the signal strength difference for UE 101 would falls below the modified handover threshold.

In some examples, a remote repeater of multiple repeaters 110-113 further down the repeater series in the direction of UE 101 mobility, such as repeater 113, is overloaded. In this example, UE 101 is transitioned from a source frequency to a target frequency band. In other examples, a remote repeater of multiple repeaters 110-113 further up the repeater series in the direction of UE 101 mobility, such as repeater 110, is underloaded. Once again, UE 101 is transitioned from a source frequency to a target frequency band.

Source repeater 111 initiates the handover of UE 101 from source repeater 111 to target repeater 112 if the signal strength difference for UE 101 reaches the modified handover threshold. In some examples, a remote repeater of multiple repeaters 110-113 further up the repeater series in the direction of UE 101 mobility, such as repeater 110, is overloaded. In this example, the handover threshold between source repeater 111 and target repeater 112 is lowered based on the overloaded repeater further up the repeater series. Therefore, the signal strength difference for UE 101 would reach the modified handover threshold and the handover of UE 101 from source repeater 111 to target repeater 112 is initiated.

In other examples, a remote repeater of multiple repeaters 110-113 further down the repeater series in the direction of UE 101 mobility, such as repeater 113, is underloaded. Once again, the handover threshold between source repeater 111 and target repeater 112 is lowered based on the underloaded repeater further down the repeater series. Therefore, the signal strength difference for UE 101 would reach the modified handover threshold and the handover of UE 101 from source repeater 111 to target repeater 112 is initiated.

In some examples, a remote repeater of multiple repeaters 110-113 further up the repeater series in the direction of UE 101 mobility, such as repeater 110, is overloaded. In this example, UE 101 is transitioned from a source frequency to a target frequency band. In other examples, a remote repeater of multiple repeaters 110-113 further down the repeater series in the direction of UE 101 mobility, such as repeater 113, is underloaded. Once again, UE 101 is transitioned from a source frequency to a target frequency band.

Figure 2:
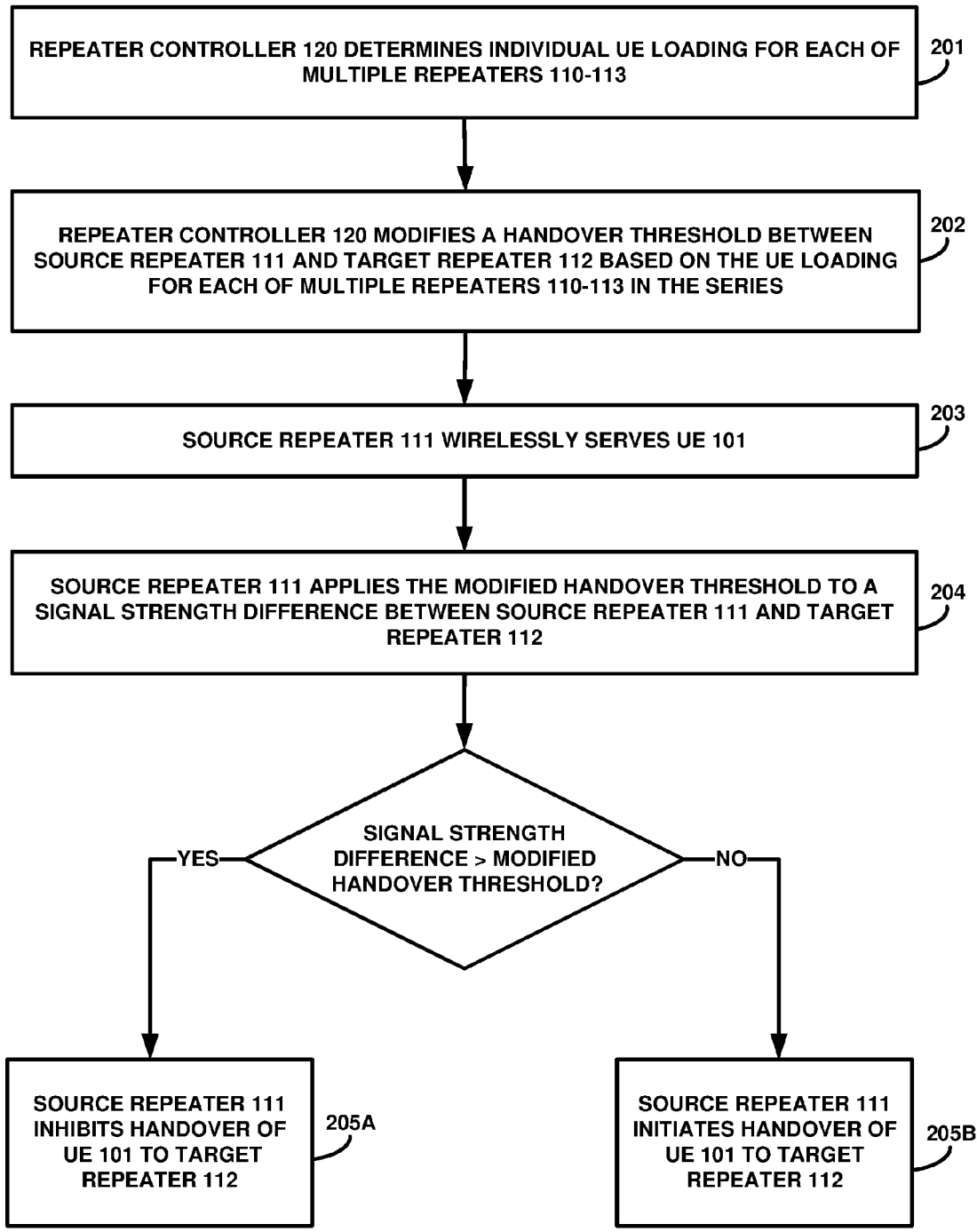
FIG. 2 is a flow diagram that illustrates the wireless communication system to dynamically control a UE handover.

FIG. 2 is a flow diagram illustrating an operation of wireless communication system 100 to dynamically control a UE handover. Repeater controller 120 determines (201) individual UE loading for each of multiple repeaters 110-113. Repeater controller 120 modifies (202) a handover threshold between source repeater 111 and target repeater 112 based on the UE loading for each of multiple repeaters 110-113 in the repeater series. Source repeater 111 wirelessly serves (203) UE 101 over source repeater 111. Source repeater 111 then applies (204) the modified handover threshold to a signal strength difference between source repeater 111 and target repeater 112. Source repeater 111 inhibits (205A) the handover of UE 101 from source repeater 111 to target repeater 112 if the signal strength difference for UE 101 falls below the modified handover threshold. Source repeater 111 initiates (205B) the handover of UE 101 from source repeater 111 to target repeater 112 if the signal strength difference for UE 101 reaches the modified handover threshold.

Figure 3:
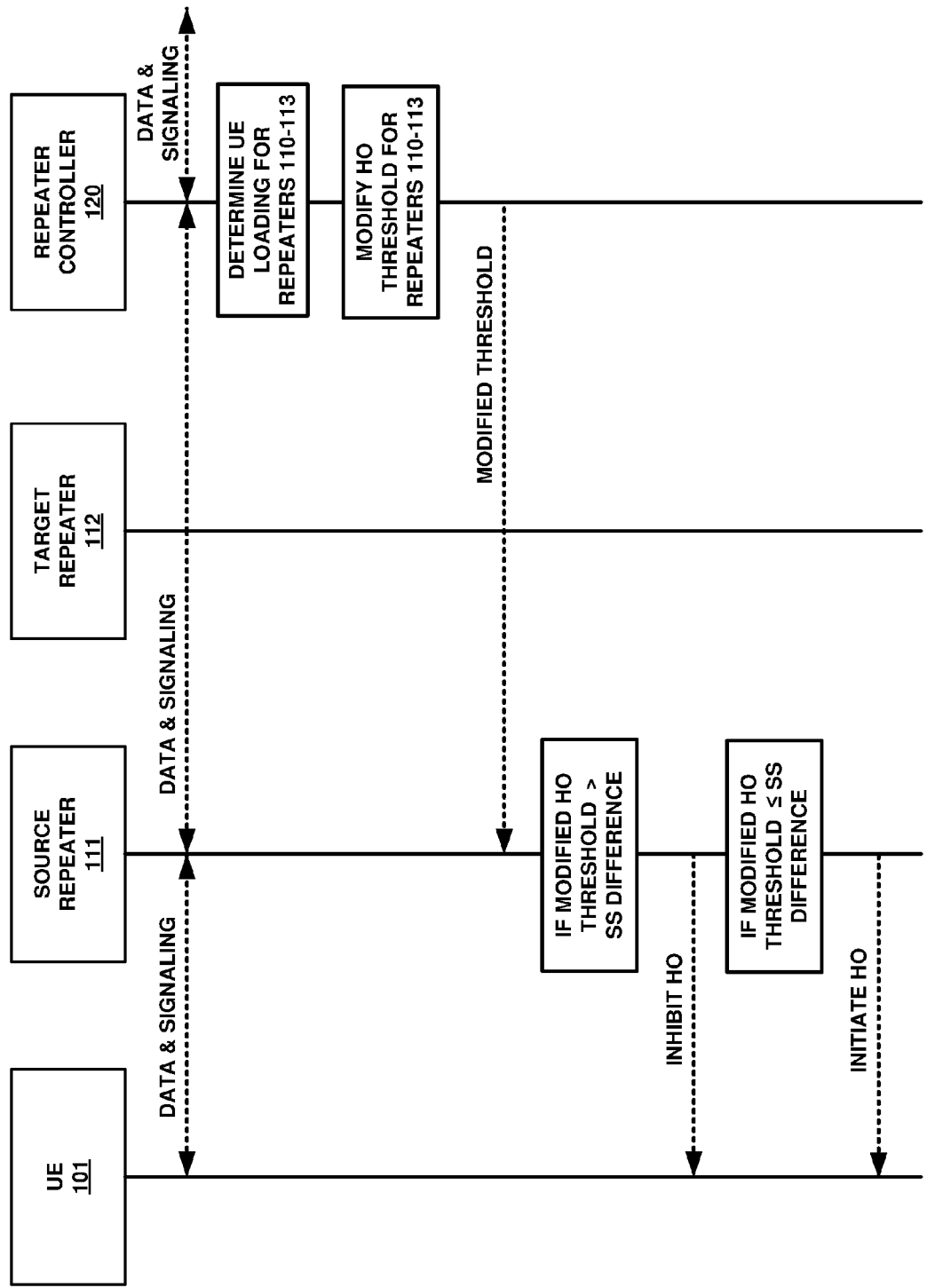
FIG. 3 is a sequence diagram that illustrates an operation of the wireless communication system to dynamically control a UE handover.

FIG. 3 is a sequence diagram illustrating the operation of wireless communication system 100 to dynamically control a UE handover. UE 101 has attached to the wireless communication network and is exchanging data and signaling over source repeater 111 and repeater controller 120. Repeater controller 120 determines individual UE loading for each of multiple repeaters 110-113. For example, repeater controller 120 may determine that repeater 110 is serving no UEs, source repeater 111 is serving UE 101, target repeater 112 is serving no UEs, and repeater 113 is serving UE 102 and UE 103.

Repeater controller 120 modifies a handover threshold between source repeater 111 and target repeater 112 based on the UE loading for each of multiple repeaters 110-113 in the repeater series. For example, repeater controller 120 may determine that repeater 113 further down the repeater series in the direction of UE mobility is overloaded. The handover threshold between source repeater 111 and target repeater 112 may then be raised. The modified handover threshold is then transferred to source repeater 111 serving UE 101. Source repeater 111 then applies the modified handover threshold to a signal strength difference between source repeater 111 and target repeater 112. In this example, source repeater 111 would then apply the raise handover threshold to the signal strength difference between source repeater 111 and target repeater 112 instead of the initial handover threshold.

Source repeater 111 inhibits the handover of UE 101 from source repeater 111 to target repeater 112 if the signal strength difference for UE 101 falls below the modified handover threshold and initiates the handover of UE 101 from source repeater 111 to target repeater 112 if the signal strength difference for UE 101 reaches the modified handover threshold. In this example, since the handover threshold has been raised by repeater controller 120, the signal strength difference for UE 101 falls below the raised handover threshold and therefore, source repeater 111 inhibits the handover of UE 101 from source repeater 111 to target repeater 112.

Advantageously, source repeater 111 withholds the handover of UE 101 to target repeater 112 until the signal strength difference between source repeater 111 and target repeater 112 is higher than it would have been before modifying the initial handover threshold. Although target repeater 112 is not overloaded, this prevents UE 101 from being handed down the repeater series toward overloaded repeater 113.

Figure 4:
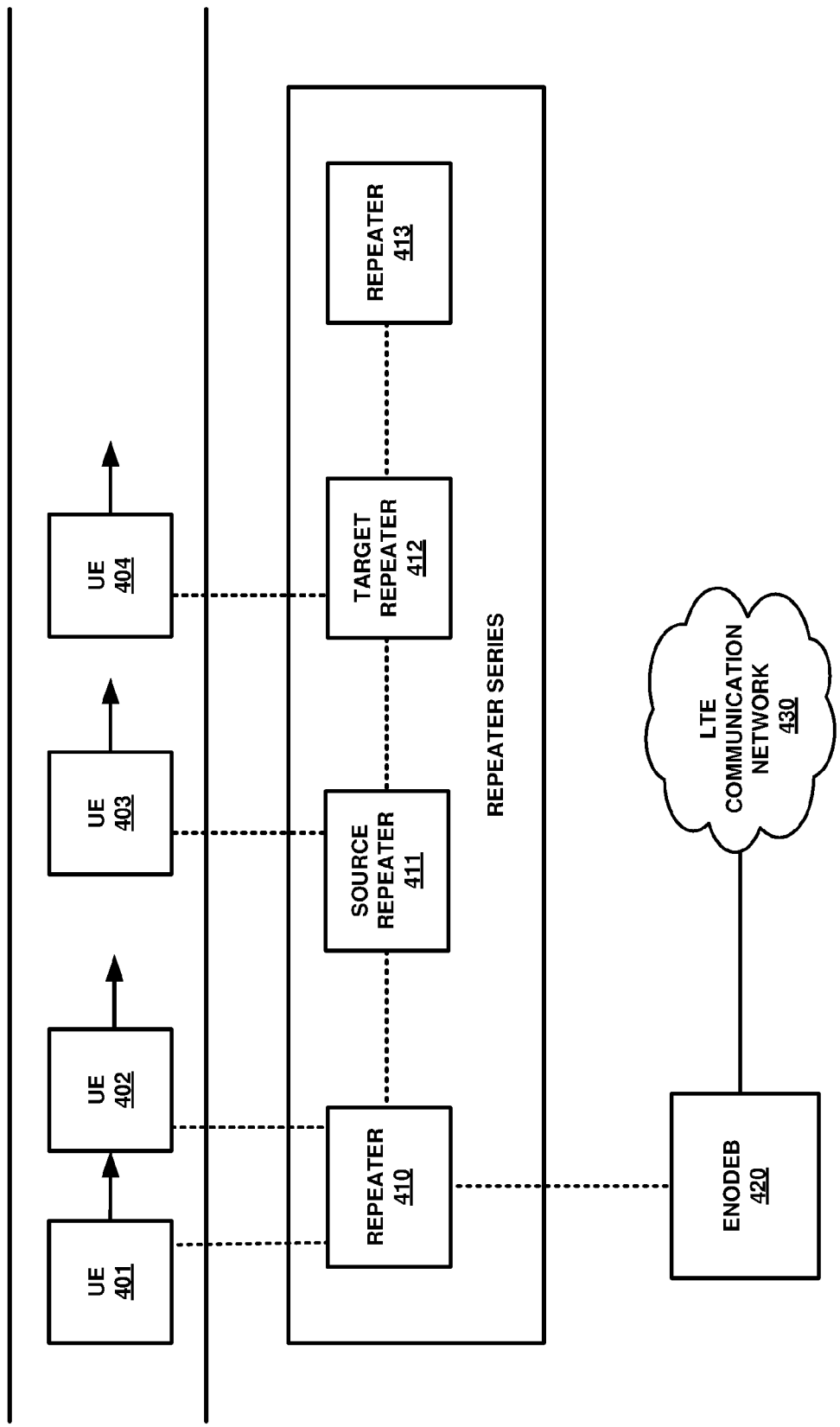
FIG. 4 illustrates an LTE communication system to dynamically control a UE handover wherein the LTE communication system comprises multiple repeaters linked in series that include a source repeater and a target repeater.
Figure 5:
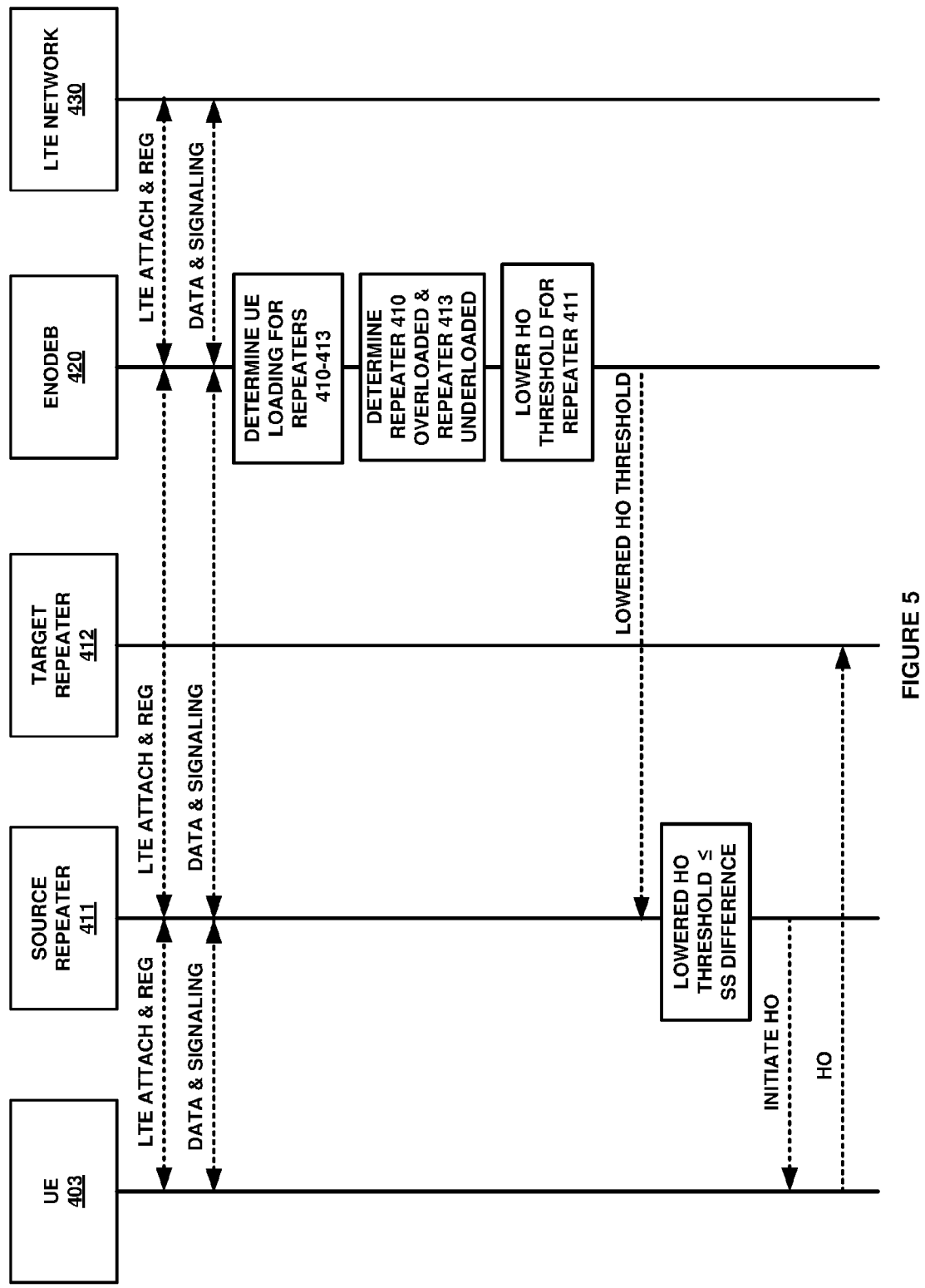
FIG. 5 illustrates an operation of the LTE communication system to dynamically control a UE handover in an exemplary embodiment.
Figure 6:
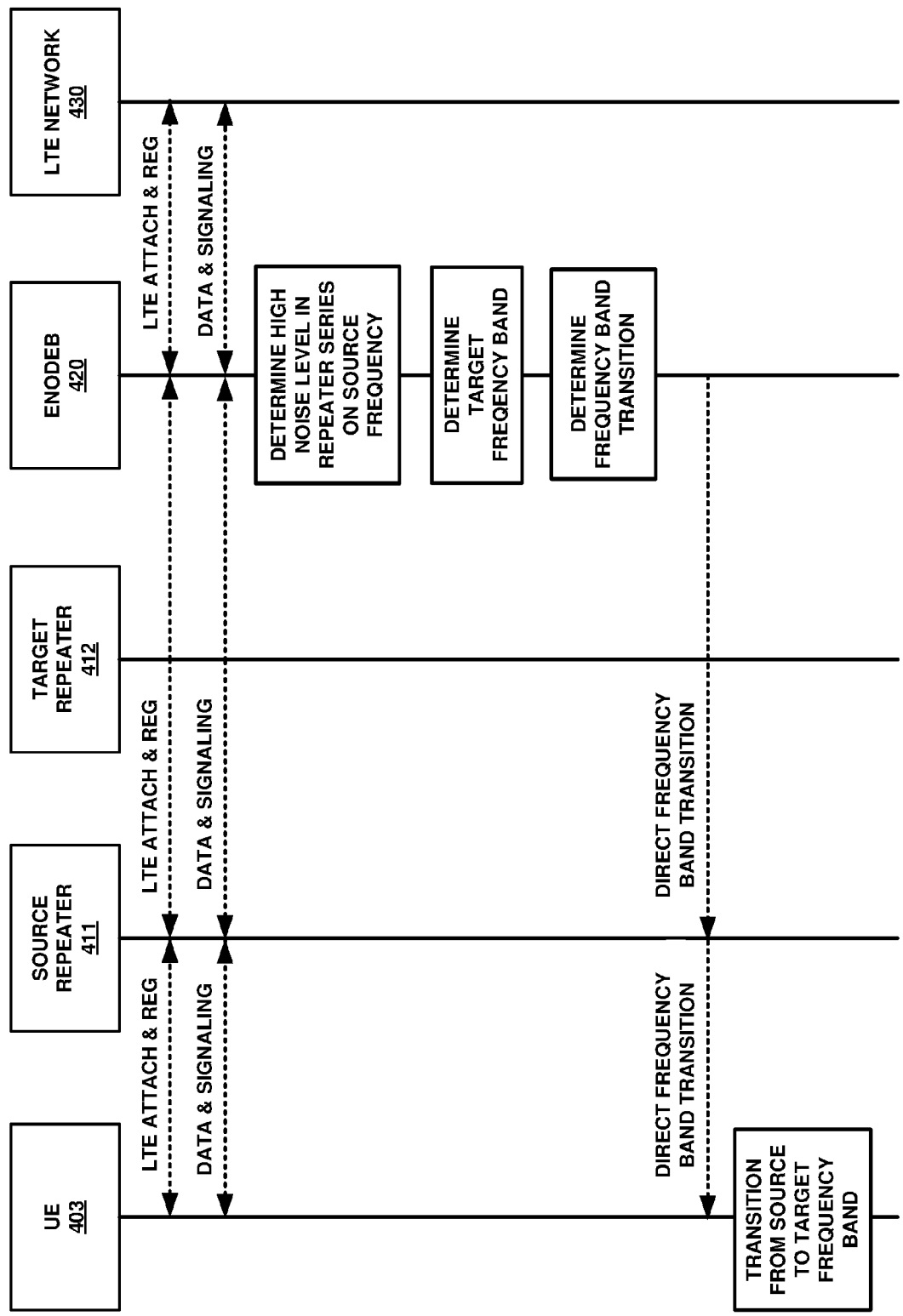
FIG. 6 illustrates an operation of the LTE communication system to dynamically control a UE handover in an exemplary embodiment.

FIGS. 4-6 illustrate Long Term Evolution (LTE) communication system 400 to dynamically handover a UE. Referring to FIG. 4, LTE communication system 400 is an example of wireless communication system 100, although wireless communication system 100 may use alternative configurations and operations. LTE communication system 400 includes UEs 401-404, a repeater series, LTE evolved NodeB (eNodeB) 420, and LTE communication network 430. The repeater series includes repeater 410, source repeater 411, target repeater 412, and repeater 413. Although not shown, LTE communication network 430 may include a Serving Gateway (S-GW), a Mobility Management Entity (MME), a Home Subscriber Server (HSS), a Packet Data Network Gateway (P-GW), and a Policy Charging Rules Function (PCRF). It should be noted that the mobility direction of UEs 401-404 is from repeater 410 to repeater 413, as indicated by the arrows. This may be due to UEs 401-404 moving along a highway.

As shown in FIG. 4, UEs 401-404 exchange data and signaling with repeaters 410-413 in the repeater series over Radio Frequency (RF) links. Repeater 410 is the first repeater in the repeater series and exchanges data and signaling with eNodeB 420 over an X2 interface communication link. eNodeB 420 communicates with the MME in LTE communication network 430 over a S1-MME signaling link. eNodeB 420 communicates with the S-GW in LTE communication network 430 over a S1-U data link.

FIG. 5 illustrates a sequence diagram of LTE communication system 400 to dynamically control a UE handover from a source repeater to a target repeater. In operation, UE 403 wirelessly attaches to and registers with LTE communication network 430. UE 403 then exchanges data and signaling with LTE communication network 430 over source repeater 411 and eNodeB 420. eNodeB 420 determines individual UE loading for each of multiple repeaters 410-413. For example, eNodeB 420 may determine that repeater 410 is serving UE 401 and UE 402, source repeater 111 is serving UE 403, target repeater 412 is serving UE 404, and repeater 413 is serving no UEs. In this scenario, eNodeB 420 determines that repeater 410 located further up the repeater series is overloaded and repeater 413 located further down the repeater series is underloaded.

Therefore, in a next operation eNodeB 420 would lower the handover threshold between source repeater 411 and target repeater 412 based on the UE loading for each of multiple repeaters 410-413 in the repeater series. eNodeB 420 would then transfer the lowered handover threshold to source repeater 411. It should be noted that although source repeater 411 and target repeater 412 have the same loading, the handover threshold is modified.

Source repeater 411 then receives the lowered handover threshold from eNodeB 420 and applies the lowered handover threshold to the signal strength difference between source repeater 411 and target repeater 412. In this example, the signal strength difference between source repeater 411 and 412 reaches the lowered handover threshold. Therefore, source repeater 411 initiates the handover of UE 403 from source repeater 411 to target repeater 412 and UE 403 performs a handover to target repeater 412.

Advantageously, source repeater 411 permits the handover of UE 403 to target repeater 412 sooner than a handover would have been permitted using the initial handover threshold. Therefore, source repeater 411 better distributes the UEs to repeaters further down the repeater series. Furthermore, source repeater 411 will not be as heavily loaded when receiving UEs from overloaded repeater 410 further up the repeater series.

FIG. 6 illustrates an alternative operation of LTE communication system 400. Similar to FIG. 6, UE 403 wirelessly attaches to and registers with LTE communication network 430. UE 403 then exchanges data and signaling with LTE communication network 430 over source repeater 411 and eNodeB 420. eNodeB 420 determines that UE 403 is experiencing high noise level in the repeater series while on a source frequency band that is part of the repeater series. eNodeB 420 may then determine that that a target frequency band may be used and that UE 403 should transition from the source frequency band to the target frequency band.

In response to receiving a direction to transition frequency bands from eNodeB 420 over source repeater 411, UE 403 would transition from the source frequency band to the target frequency band. Advantageously, transitioning UE 403 from the source frequency band to the target frequency band allows UE 403 to be re-directed from a frequency band with high noise in the repeater series to a frequency band with low noise in the repeater series coverage area.

Figure 7:
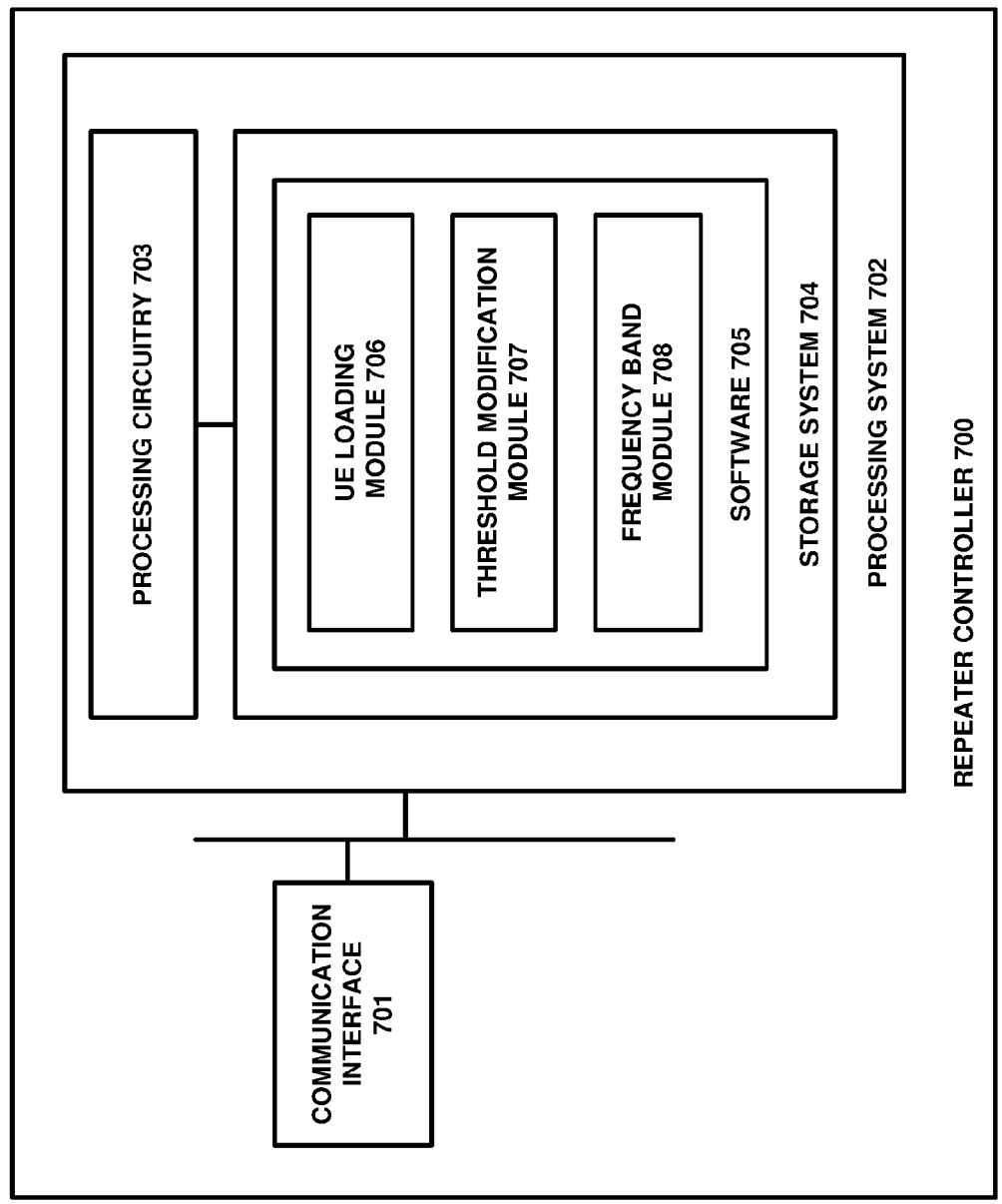
FIG. 7 illustrates a repeater controller to dynamically control a UE handover.

FIG. 7 illustrates repeater controller 700 to dynamically control the handover of a UE. Repeater controller 700 is an example of repeater controller 120 and eNodeB 420, although repeater controller 120 and eNodeB 420 may use alternative configurations and operations. Repeater controller 700 includes communication interface 701 and data processing system 702. Data processing system 702 is linked to communication interface 701.

Communication interface 701 comprises communication components, such as antennas, ports, amplifiers, filters, modulators, signal processors, and the like. Communication interface 701 may be configured to communicate over metallic, wireless, optical links, or some other communication media material.

Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to receive UE loading from multiple repeaters in a repeater series. Communication interface 701 may also be configured to transfer modified handover thresholds to multiple repeaters in a repeater series.

Data processing system 702 includes processing circuitry 703 and storage system 704 that stores software 705. Processing circuitry 703 comprises a microprocessor and other circuitry that retrieves and executes software 705 from storage system 704. Storage system 704 comprises a non-transitory storage medium, such as a disk drive, flash drive, data storage circuitry, or some other memory apparatus. Software 705 comprises computer programs, firmware, or some other form of machine-readable processing instructions. Software 705 may further include an operating system, utilities, drivers, network interfaces, applications, or some other type of software. When executed by processing circuitry 703, software 705 directs processing system 702 to operate LTE communication system 700 as described herein.

In particular, when executed by processing circuitry 703, UE loading module 706 directs processing circuitry 704 to determine individual UE loading for each of the multiple repeaters linked in series. When executed by processing circuitry 703, threshold modification module 707 directs processing circuitry 703 to modify a handover threshold between the source repeater and the target repeater based on the UE loading for each of the multiple repeaters in the series. When executed by processing circuitry 703, frequency band module 708 directs processing circuitry 703 transition a UE from a source frequency to a target frequency.

Figure 8:
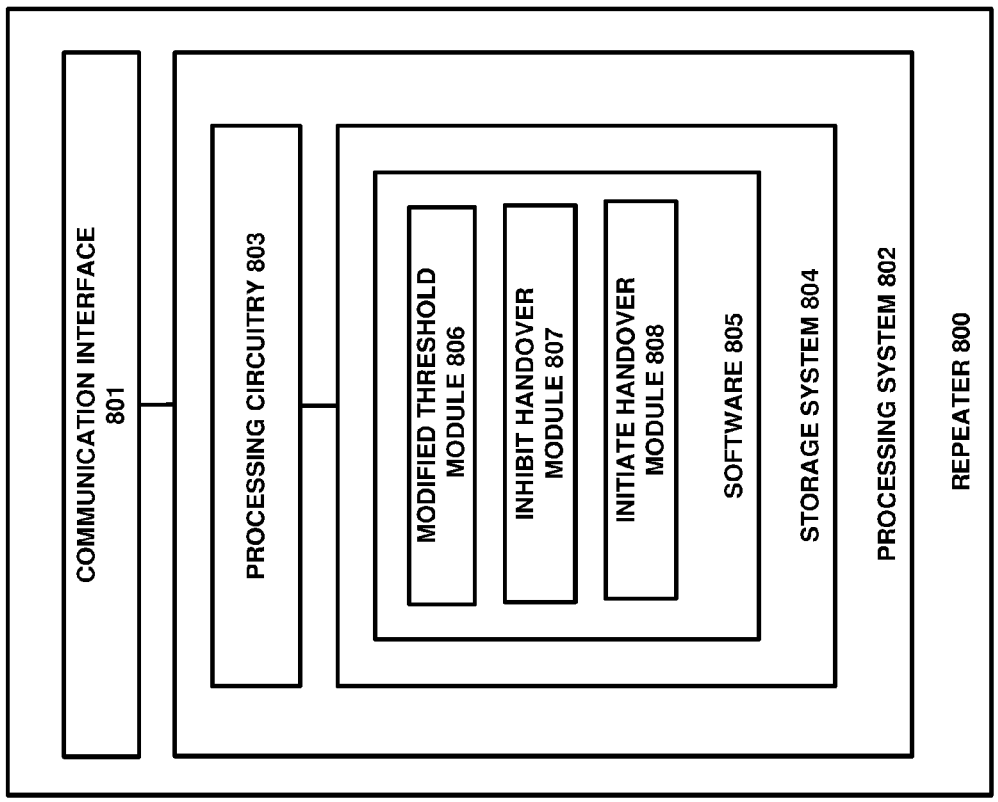
FIG. 8 illustrates a repeater linked in series with multiple repeaters to handover a UE.

FIG. 8 illustrates a repeater in a repeater series to handover a UE. Repeater 800 is an example of source repeater 111 and source repeater 411, although source repeater 111 and source repeater 411 may use alternative configurations and operations. Repeater 800 includes communication interface 801 and data processing system 802. Data processing system 802 is linked to communication interface 801.

Communication interface 801 comprises communication components, such as antennas, ports, amplifiers, filters, modulators, signal processors, and the like. Communication interface 801 may be configured to communicate over metallic, wireless, optical links, or some other communication media material.

Communication interface 801 may be configured to use Time Division Multiplex (TDM), Internet Protocol (IP), wireless protocols, communication signaling, or some other communication format—including combinations thereof. In particular, communication interface 801 may be configured to exchange data and signaling between a repeater control system and a UE.

Data processing system 802 includes processing circuitry 803 and storage system 804 that stores software 805. Processing circuitry 803 comprises a microprocessor and other circuitry that retrieves and executes software 805 from storage system 804. Storage system 804 comprises a non-transitory storage medium, such as a disk drive, flash drive, data storage circuitry, or some other memory apparatus. Software 805 comprises computer programs, firmware, or some other form of machine-readable processing instructions. Software 805 may further include an operating system, utilities, drivers, network interfaces, applications, or some other type of software. When executed by processing circuitry 803, software 805 directs processing system 802 to operate donor base station 800 as described herein.

In particular, when executed by processing circuitry 803, modified threshold module 806 directs processing circuitry 804 to apply the modified handover threshold to a signal strength difference between the repeater and a target repeater. When executed by processing circuitry 803, inhibit handover module 807 directs processing circuitry 803 inhibit the handover of the UE from the repeater to a target repeater if the signal strength difference for the UE falls below the modified handover threshold. When executed by processing circuitry 803, initiate handover module 808 directs processing circuitry 803 to initiate the handover of the UE from the repeater to a target repeater if the signal strength difference for the UE reaches the modified handover threshold.

Referring back to FIG. 1, UEs 101-103 could be a phone, tablet computer, media device, or some other apparatus having a wireless LTE transceiver. UEs 101-103 includes processing circuitry and memory that store and execute various software modules. UEs 101-103 comprises communication transceivers, such as antennas, ports, bus interfaces, signal processors, memory, and software.

Multiple repeaters 110-113 and repeater controller 120 each may include communication interfaces, network interfaces, processing systems, computer systems, microprocessors, storage systems, storage media, or some other processing devices or software systems, and may be distributed among multiple devices. In particular, multiple repeaters 110-113 and repeater controller 120 may be configured to provide wireless coverage to one or more UEs. Repeater controller 120 is a control node within the wireless access network and is responsible for determining UE loading for each of multiple repeaters 110-113 and modifying a handover threshold between source repeater 111 and target repeater 112. Repeater controller 120 may be located in a core wireless access network, in a separate NFV containing other network elements, or distributed among multiple networks. Repeater controller 120 may be an eNodeB, a wireless base station, an MME, an external control element, or some other network element.

Wireless links 130-136 may use air, space, or some other wireless material that transports media. Wireless links 130-136 may use protocols, such as LTE, Code Division Multiple Access (CDMA), Orthogonal Frequency Division Multiplexing Access (OFDMA), LTE Wireless Aggregation (LWA), Internet Protocol (IP), or some other wireless communication format—including combinations thereof.

Communication link 137 may use metal, glass, optics, air, space, or some other material as the transport media. Communication link 137 may use Time Division Multiplexing (TDM), IP, Ethernet, Synchronous Optical Networking (SONET), communication signaling, wireless communications, or some other communication format—including improvements thereof. Communication link 137 may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication system to dynamically control a User Equipment (UE) handover, the method comprising:
   determining individual UE loading for multiple repeaters linked in series that include a source repeater and a target repeater and determining a remote one of the multiple repeaters further down the repeater series in the direction of UE mobility is overloaded;
   raising a handover threshold between the source repeater and the target repeater based on the overloaded repeater;
   wirelessly serving a UE over the source repeater and applying the raised handover threshold to a signal strength difference between the source repeater and the target repeater;
   inhibiting the handover of the UE from the source repeater to the target repeater if the signal strength difference for the UE falls below the modified handover threshold; and
   initiating the handover of the UE from the source repeater to the target repeater if the signal strength difference for the UE reaches the modified handover threshold.

2. The method of claim 1 further comprising:
   determining a remote one of the multiple repeaters further up the repeater series in the direction of UE mobility is overloaded; and
   lowering the handover threshold between the source repeater and the target repeater based on the overloaded repeater.

3. The method of claim 1 further comprising:
   determining a remote one of the multiple repeaters further down the repeater series in the direction of UE mobility is underloaded; and
   lowering the handover threshold between the source repeater and the target repeater based on the underloaded overloaded repeater.

4. The method of claim 1 further comprising:
   determining a remote one of the multiple repeaters further up the repeater series in the direction of UE mobility is underloaded; and
   raising the handover threshold between the source repeater and the target repeater based on the underloaded repeater to accelerate handovers.

5. The method of claim 1 wherein the multiple repeaters serve the UEs using a source frequency band and a target frequency band, further comprising:
   determining a remote one of the multiple repeaters further down the repeater series in the direction of UE mobility is overloaded; and
   transitioning the UE from the source frequency band to the target frequency band.

6. The method of claim 1 wherein the multiple repeaters serve the UEs using a source frequency band and a target frequency band, further comprising:
   determining a remote one of the multiple repeaters further up the repeater series in the direction of UE mobility is overloaded; and
   transitioning the UE from the source frequency band to the target frequency band.

7. The method of claim 1 wherein the multiple repeaters serve the UEs using a source frequency band and a target frequency band, further comprising:
   determining a remote one of the multiple repeaters further down the repeater series in the direction of UE mobility is underloaded; and
   transitioning the UE from the source frequency band to the target frequency band.

8. The method of claim 1 wherein the multiple repeaters serve the UEs using a source frequency band and a target frequency band, further comprising:
   determining a remote one of the multiple repeaters further up the repeater series in the direction of UE mobility is underloaded; and
   transitioning the UE from the source frequency band to the target frequency band.

9. The method of claim 1 wherein the multiple repeaters comprise Long Term Evolution (LTE) repeaters.

10. A method of operating a wireless communication system to dynamically control a User Equipment (UE) handover, the method comprising:
    determining individual UE loading for multiple repeaters linked in series that include a source repeater and a target repeater and determining a remote one of the multiple repeaters further up the repeater series in the direction of UE mobility is underloaded;
    raising a handover threshold between the source repeater and the target repeater based on the underloaded repeater;
    wirelessly serving a UE over the source repeater and applying the raised handover threshold to a signal strength difference between the source repeater and the target repeater;
    inhibiting the handover of the UE from the source repeater to the target repeater if the signal strength difference for the UE falls below the modified handover threshold; and
    initiating the handover of the UE from the source repeater to the target repeater if the signal strength difference for the UE reaches the modified handover threshold.

11. The method of claim 10 further comprising:
    determining a remote one of the multiple repeaters further up the repeater series in the direction of UE mobility is overloaded; and
    lowering the handover threshold between the source repeater and the target repeater based on the overloaded repeater.

12. The method of claim 10 further comprising:
    determining a remote one of the multiple repeaters further down the repeater series in the direction of UE mobility is underloaded; and
    lowering the handover threshold between the source repeater and the target repeater based on the underloaded repeater.

13. The method of claim 10 further comprising:
    determining a remote one of the multiple repeaters further down the repeater series in the direction of UE mobility is overloaded; and
    raising the handover threshold between the source repeater and the target repeater based on the overloaded repeater to accelerate handovers.

14. The method of claim 10 wherein the multiple repeaters serve the UEs using a source frequency band and a target frequency band, further comprising:
- determining a remote one of the multiple repeaters further down the repeater series in the direction of UE mobility is overloaded; and
- transitioning the UE from the source frequency band to the target frequency band.

15. The method of claim 10 wherein the multiple repeaters serve the UEs using a source frequency band and a target frequency band, further comprising:
- determining a remote one of the multiple repeaters further up the repeater series in the direction of UE mobility is overloaded; and
- transitioning the UE from the source frequency band to the target frequency band.

16. The method of claim 10 wherein the multiple repeaters serve the UEs using a source frequency band and a target frequency band, further comprising:
- determining a remote one of the multiple repeaters further down the repeater series in the direction of UE mobility is underloaded; and
- transitioning the UE from the source frequency band to the target frequency band.

17. The method of claim 10 wherein the multiple repeaters serve the UEs using a source frequency band and a target frequency band, further comprising:
- determining a remote one of the multiple repeaters further up the repeater series in the direction of UE mobility is underloaded; and
- transitioning the UE from the source frequency band to the target frequency band.

18. The method of claim 10 wherein the multiple repeaters comprise Long Term Evolution (LTE) repeaters.

* * * * *